Figure 1:
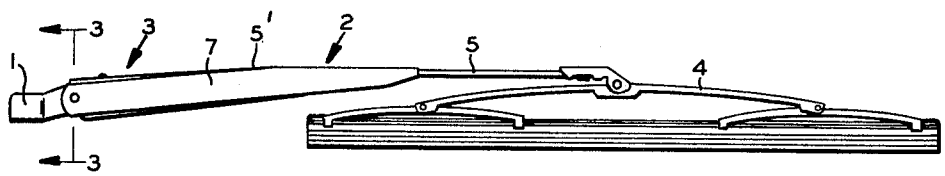

June 15, 1965 L. J. WUBBE 3,188,679
WIPER ARM PIVOT
Filed Oct. 22, 1962

INVENTOR.
LEO J. WUBBE
BY
ATTORNEY

3,188,679
WIPER ARM PIVOT
Leo J. Wubbe, Beverly Shores, Ind., assignor to The Anderson Company, a corporation of Indiana
Filed Oct. 22, 1962, Ser. No. 231,950
4 Claims. (Cl. 15—250.35)

The subject invention relates generally to pivot means and more particularly is directed to improvements in means for pivotally connecting an inner shaft-attaching section or fitting and an outer spring-urged blade-carrying section or unit of a windshield wiper arm.

Due to the fact that windshield wiper arms are being made heavier and longer and the blades are directed across surfaces of variable curvatures, greater spring pressures are required to maintain the blade in proper wiping altitude against the surface of a windshield, all of which places considerable pivotal and torsional strain on the pivotal connection between the arm sections.

With the foregoing in mind, the principal object of the invention is to provide an assembly in which the outer blade-carrying unit includes a channel portion or member having side walls provided with aligned openings and the fitting or attaching section has a portion disposed in the channel between its side walls and provided with a bore aligned with the openings, a pivot sleeve disposed in the bore and provided with reduce extremities disposed in the apertures, and an elongate cylindrical member which extends through the bore, sleeve and openings and has abutments forcibly arranged in relation to outer surfaces of the side walls for creating a condition to cause the reduced extremities to intimately engage the material defining the openings and the elongate member to effect a locking of the sleeve, member and channel together as a unit for pivotal movement relative to the fitting.

More specifically, an important object of the invention is to provide an assembly of the character above described in which the elongate member serves to move the side walls of the channel toward one another so that the marginal edge portions of the material defining the openings in the side walls will cause these portions to forcibly engage the reduced extremities of the sleeve to disort the latter and said portions into firm locking engagement and, at the same time, cause such extremities to distortably clamp against the cylindrical surface of the member to positively and permanently lock the sleeve to the channel and member.

Another object of the invention is to provide an assembly of the kind described in which the inner fitting or section is provided with a cylindrical bearing which is press-fitted into the bore and pivotally receives the sleeve above referred to.

A specific object of the invention is to provide an assembly in which a pair of relatively large concentrically arranged bearing surfaces are provided.

Other objects of the invention reside in providing an organization of components which offer advantages with respect to manufacture and assembly, efficiency in operation and durability.

Additional advantages of the invention will become apparent after the description hereinafter set forth is considered in conjunction with the drawings annexed hereto.

Figure 2:
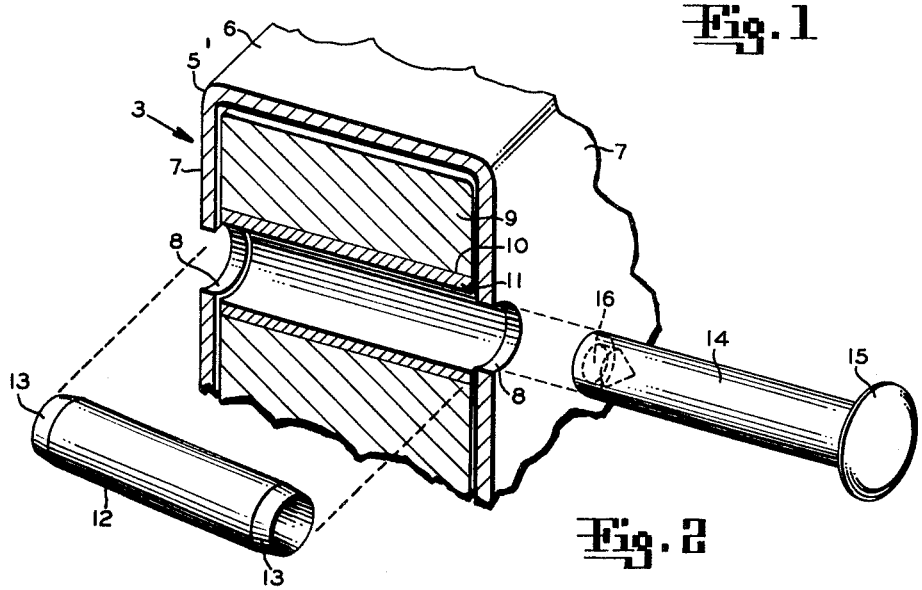
Figure 3:
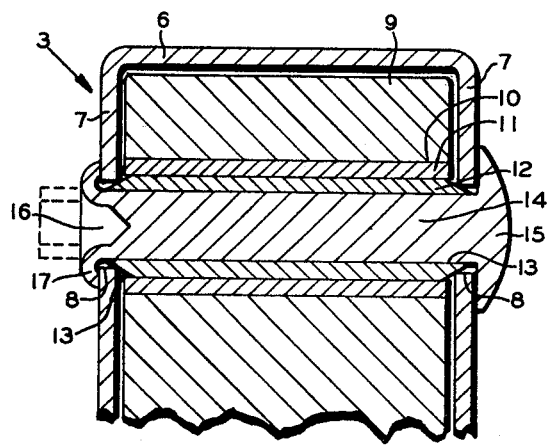

In the drawings:
FIGURE 1 is a side elevational view of a wiper arm embodying the invention and a wiper blade carried by an outer section or unit of the arm;
FIGURE 2 is an enlarged perspective and exploded view of a part of the assembly, with portions in section to illustrate details of the structure; and
FIGURE 3 is an enlarged vertical section taken substantially on line 3—3 of FIGURE 1, showing the mode of permanently fastening the components together.

Referring more particularly to the drawing, an inner fitting or section 1 is provided with means (not shown) for attachment to driving means; an outer unit or section generally designated 2 pivotally connected to the fitting by pivot means generally designated 3; and 4 is a wiper blade attached to an extension 5 of the section 2.

The subject invention is directed to the pivot means 3 and the structure thereof will now be described. The outer arm unit or section also includes a channel 5' having a bottom wall 6 and side walls 7. The extension 5 is preferably constructed of bar stock and has its inner end secured against or for movement in the outer end of the channel. A spring or biasing means (not shown) is disposed in the channel and operatively connected to the arm sections for urging the outer section and blade toward a windshield to be wiped. The inner ends of the side walls 7 are provided with aligned round apertures 8 defined by marginal edge portions of the material from which the channel is made.

The inner fitting or arm section 1 is formed to include a solid portion 9 disposed between the side walls and is provided with a transverse cylindrical bore 10, and a cylindrical tubular bearing sleeve 11 is preferably press-fitted into the bore so its ends are flush with parallel side surfaces of the portion 9.

A cylindrical tubular sleeve 12 having an outside diameter somewhat less than the inside diameter of the bearing sleeve 11 is journalled in the latter and provided with tapered or wedgelike extremities or ends 13 which are adapted for disposition in the apertures 8 by spreading apart the side walls 7 of the channel so that the extremities will be disposed for ultimately engaging the inner marginal arrises of the openings as depicted in FIGURE 3.

An elongate member or element 14 has a cylindrical shank or portion which extends through the apertures 8 in the side walls 7 and through the sleeve 11, with its head 15, constituting an abutment, engaging an external surface of one of the walls and its free end projecting outwardly from an external surface of the opposite side wall. The free end is provided with a cylindrical axial extending recess 16 whereby to facilitate upsetting or flanging over of the end from the dotted-line position shown in FIGURE 3 against the external surface of the aforesaid opposite side wall as indicated at 17 for drawing the side walls toward one another and, at the same time, force the tapered extremities 13 into intimate engagement with inner edges of the apertures 8 and into clamping engagement with the cylindrical surface of the member 14 at longitudinally spaced locations. The extremities 13 are distorted to some extent into conforming relationship with the member and the apertures. The latter are also distorted to some extent, all for the purpose of producing positive and permanent locked connections between the sleeve 12, member 14 and channel for movement, as a unit, relative to the inner fitting or section 1. With this arrangement, the components are held in operative relationship with relatively large concentrically arranged cylindrical bearing surfaces of the sleeves which serves to stabilize relative movement between the arm sections. FIGURES 2 and 3 disclose a sleeve 11, but it is obvious that the bearing or wearing surface may be provided directly in solid portion 9.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. A pivot joint of the character described comprising a channel member having side walls provided with aligned apertures, a fitting having at least a portion thereof disposed in said channel between said walls and provided with a cylindrical bore aligned with said apertures, a sleeve disposed in said bore and provided with wedge-shaped extremities disposed within said apertures, and an elongate member extending through said bore, said sleeve and said apertures and having abutments forcibly engaging outer surfaces of said walls effecting intimate engagement between said extremities and the material defining said apertures and said elongate member for locking said sleeve, said elongate member and said channel member together as a unit for pivotal movement relative to said fitting.

2. A windshield wiper arm comprising a fitting for attachment to driving means and an outer blade carrying unit having a channel portion provided with side walls having aligned apertures therein, said fitting having at least a portion thereof disposed in said channel between said walls and provided with a cylindrical bore aligned with said apertures, a sleeve disposed in said bore and provided with reduced diameter portions tapered inwardly toward their extremity and disposed within said apertures, and an elongate member extending through said bore, said sleeve and said apertures and having abutments arranged in pressure engagement with outer surfaces of said walls for effecting intimate engagement between said tapered portions and the material defining said apertures and said elongate member for locking said sleeve, said elongate member and said channel member together as a unit for pivotal movement relative to said fitting.

3. A pivot joint of the character described comprising a channel member having side walls provided with aligned apertures, a fitting having at least a portion thereof disposed in said channel between said walls and provided with a cylindrical bore aligned with said apertures, a pivot sleeve disposed in said bore and provided with reduced extremities extending into said apertures for wedging relationship radially thereagainst, and an elongate member extending through said bore, said sleeve and said openings and having abutments forcibly engaging outer surfaces of said walls for causing the material defining said apertures to intimately engage said extremities and clamp the latter against said elongate member for locking said sleeve, said elongate member and said channel member together as a unit for pivotal movement relative to said fitting.

4. A pivot joint of the character described comprising:

a first member including a pair of spaced-apart depending side walls, a second member including a portion disposed between said side walls, said portion of said second member provided with a cylindrical bore axially aligned with apertures provided in said side walls, sleeve means freely received in said cylindrical bore for pivotal movement therein, said sleeve means having inwardly tapered ends extending into said aperture for radial camming relationship therewith, elongate means extending through said sleeve means and having portions disposed outside said walls for forcibly clamping said walls thereby fixedly engaging said inwardly tapered ends radially in said apertures and compressing said sleeve means radially inwardly adjacent said inwardly tapered ends into holding contact with said elongate means extending therethrough, whereby a pivot joint is established between said first member and said second member.

References Cited by the Examiner

UNITED STATES PATENTS

| | | | |
|---|---|---|---|
| 738,975 | 9/03 | Berry | 287—96 |
| 2,919,942 | 1/60 | Bechtel | 287—96 |
| 3,099,030 | 7/63 | Zury | 15—250.35 |

CHARLES A. WILLMUTH, *Primary Examiner.*